April 9, 1957 A. J. PRITCHARD 2,788,221
VEHICLE STEERING IDLER ARM BRACKET
Filed Oct. 11, 1954
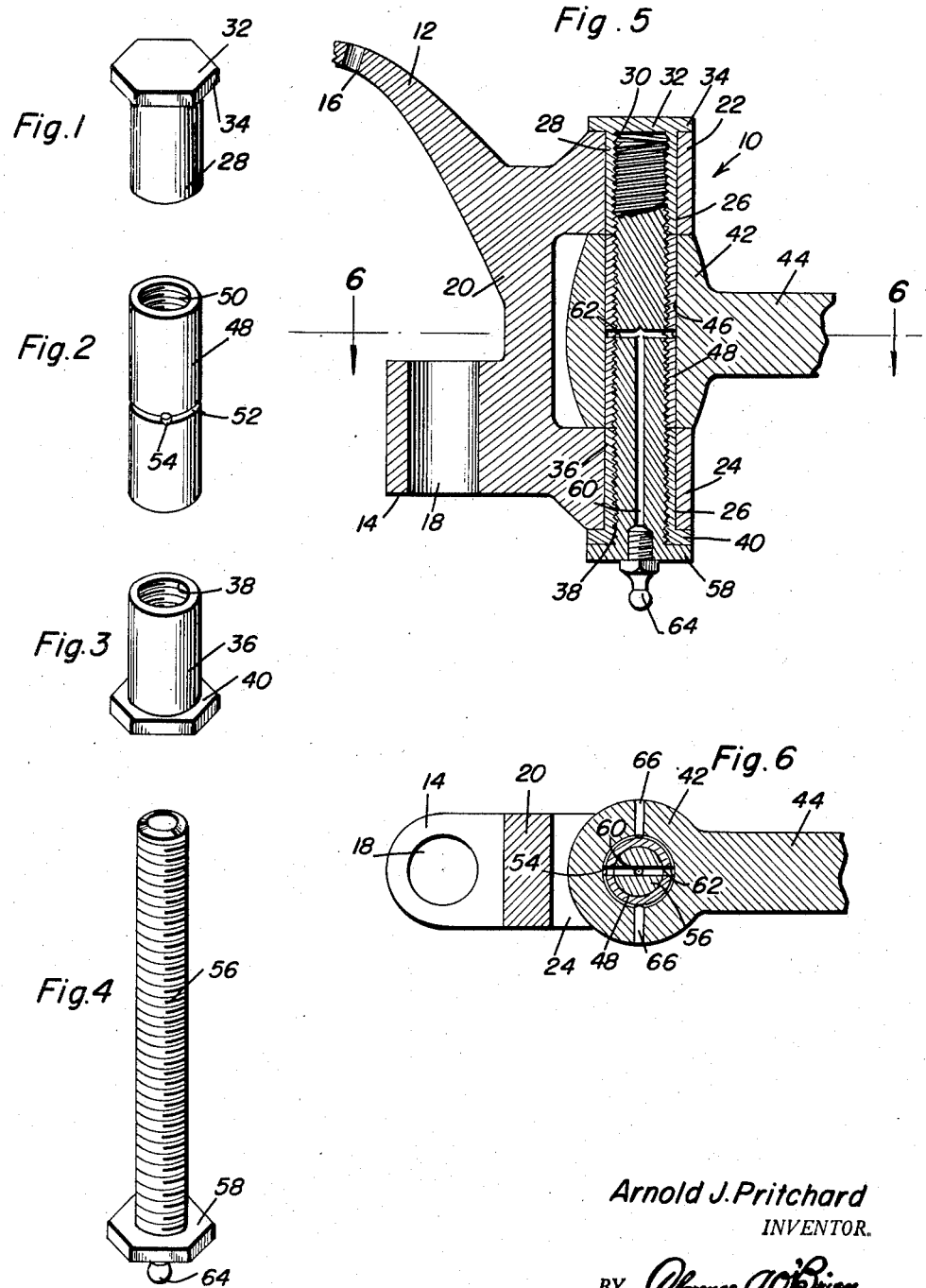
Arnold J. Pritchard
INVENTOR.

United States Patent Office 2,788,221
Patented Apr. 9, 1957

2,788,221

VEHICLE STEERING IDLER ARM BRACKET

Arnold J. Pritchard, Carnegie, Okla.

Application October 11, 1954, Serial No. 461,524

4 Claims. (Cl. 280—95)

This invention relates to a steering idler arm bracket and more specifically provides improved construction for supporting the idler arm in the conventional center form steering.

An object of this invention is to provide a conversion kit for use in supporting a steering idler arm with a minimum of wear and a minimum of replacement and repair.

A further object of the present invention is to provide a sleeve bushing arrangement together with a threaded pin for retaining the idler arm on the idler arm bracket.

Still another important object of the present invention is to provide a steering idler arm bracket that is simple in construction, long-lasting, easy to install, easy to repair after long use, well adapted for its intended purposes and relatively inexpensive to manufacture.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the upper sleeve bushing of the conversion kit of the present invention;

Figure 2 is a perspective view showing the central sleeve bushing of the conversion kit;

Figure 3 is a perspective view of the bottom sleeve bushing of the present invention;

Figure 4 is a perspective view of the externally threaded securing pin for retaining the idler arm in assembled relation on the idler arm bracket;

Figure 5 is a vertical, sectional view taken substantially upon a plane passing through the longitudinal center of the idler arm bracket of the present invention and showing the details of construction of the elements of the invention; and Figure 6 is a top plan sectional view taken substantially upon a plane passing along section line 6—6 of Figure 5 showing further structural details of the idler arm bracket, idler arm and interconnecting means.

Referring now specifically to the drawings, it will be seen that the numeral 10 generally designates the idler arm bracket of the present invention wherein the idler arm bracket 10 generally includes a pair of supporting arms 12 and 14 having apertures 16 and 18 thereon for engaging and supporting the bracket 10 on a suitable portion of the vehicle frame. A central vertically elongated attaching portion 20 joins the upper arm 12 and the lower arm 14 of the bracket 10. Extending outwardly from the vertically elongated attaching member is a pair of vertically aligned and spaced bosses 22 and 24. Each of the bosses 22 and 24 are provided with a cylindrical opening 26 wherein the cylindrical openings 26 are in vertical alignment and are spaced from each other. Pressed into the cylindrical opening 26 in the upper boss 22 is an upper cylindrical bushing 28 that is internally threaded as indicated by the numeral 30 and includes a closure cap 32 integrally formed therewith and including a peripheral outwardly extending flange 34 for engagement with the upper end of the boss 22 thereby limiting the insertion of the bushing 28 into the cylindrical opening 26. The lower end of the bushing 28 terminates flush with the lower end of the boss 22 thereby forming a sleeve bushing for the boss 22.

In the bottom boss 24 is inserted a sleeve bushing 36 in the cylindrical opening 26 and the bushing 36 is internally threaded as indicated by the numeral 38 similar to the internal threads on the upper bushing 28. The lower bushing 36 is provided with a peripheral flange 40 which engages the lower surface of the boss 24 thereby limiting the insertion of the bushing 36 into the lower boss 24 wherein the lower bushing 36 terminates flush with the upper edge of the lower boss 24.

Positioned between the bosses 22 and 24 is an enlarged boss 42 formed integrally with the idler arm 44 wherein the boss 42 is provided with a longitudinal bore 46 extending therethrough. A central bushing 48 having a longitudinal bore with internal threads 50 therein is positioned within the bore 46. The outer surface of the bushing 48 is provided with centrally located peripheral grooves 52 that have diametrically opposed apertures 54 therein for communicating the interior of the bushing 48 with the surface of the boss 42.

Threadedly engaging all of the bushings 36, 48 and 28 is an externally threaded pin 56 having an enlarged headed end flange 58 integral on the bottom thereof and provided with a longitudinal bore 60 extending halfway through the length thereof and terminating in a transverse bore 62 for communicating with the apertures 54 in the bushing 48 thereby lubricating the inner surface of the bore 46 and the bushing 48 through the use of a lubricating fitting 64. The headed end 58 is polygonal for receiving a wrench and will jam against the peripheral flange 40 for locking the pin 56 in the bushing thereby securing the idler arm 44 to the idler arm bracket 10. When assembled, the bushings 28, 48 and 36 will be in vertical alignment with the externally threaded pin 56 engaging the internal thread in all of the bushings thereby retaining the idler arm on the idler arm bracket 10 in pivotal relation. The grease fitting 64 permits lubrication of the moving surfaces thereby facilitating the ease of the pivotal movement and also reducing the wear caused by friction.

The closure member 32 on the bushing 28 prevents deposits of dirt from coming into contact with the interior of the bushing thereby retaining the entire device in a relatively clean condition thereby keeping the device trouble free.

When repair of the unit becomes necessary, it is only necessary to remove the pin 56, replace the bushing 48 and replace the pin 56 with a new pin thereby picking up any looseness caused by wear. All the bushings are press fitted into their respective openings and the pin 56 units all the bushings into substantially one bushing element.

In assembling the device of this invention, no particular mechanical skills or precision machining are necessary and no special tools are required. None of the parts are resurfaced or reamed and subsequent repair jobs are easily and quickly carried out by replacement of a minimum number of parts without requiring any reaming or precision machining of the parts. After the initial installation, the parts may be replaced without removing the bracket from the vehicle frame thereby reducing the time and labor required for replacing the worn parts and eliminating any looseness caused thereby, thereby forming an entirely safe steering linkage that is free from excessive looseness.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A bracket for supporting a steering idler arm with a cylindrical opening therein comprising a vertically elongated attaching member, a pair of vertically aligned and spaced bosses having aligned cylindrical openings, an externally threaded pin extending through said openings and through the cylindrical opening in the idler arm thereby retaining the idler arm between said bosses, said cylindrical openings having sleeve bushings positioned therein, in end to end contact thereby forming a continuous bushing, said sleeve bushings being internally threaded for receiving the externally threaded pin.

2. A bracket for supporting a steering idler arm with a cylindrical opening therein comprising a vertically elongated attaching member, a pair of vertically aligned and spaced bosses having aligned cylindrical openings, an externally threaded pin extending through said openings and through the cylindrical opening in the idler arm thereby retaining the idler arm between said bosses, said cylindrical openings having sleeve bushings positioned therein in end to end contact thereby forming a continuous bushing, said sleeve bushings being internally threaded for receiving the externally threaded pin, said bushings in the upper and lower openings being provided with a peripheral exterior flange on the outer ends thereof for limiting the inward movement of the bushings, said upper bushing flange including a closure thereby sealing the interior of the bushings.

3. A bracket for supporting a steering idler arm with a cylindrical opening therein comprising a vertically elongated attaching member, a pair of vertically aligned and spaced bosses having aligned cylindrical openings, an externally threaded pin extending through said openings and through the cylindrical opening in the idler arm thereby retaining the idler arm between said bosses, said cylindrical openings having sleeve bushings positioned therein in end to end contact thereby forming a continuous bushing, said sleeve bushings being internally threaded for receiving the externally threaded pin, said bushings in the upper and lower openings being provided with a peripheral exterior flange on the outer ends thereof for limiting the inward movement of the bushings, said upper bushing flange including a closure thereby sealing the interior of the bushings, said pin having an integral headed end flange on the lower end thereof for abutting locking engagement with the flange on the lower bushing.

4. A bracket for supporting a steering idler arm with a cylindrical opening therein comprising a vertically elongated attaching member, a pair of vertically aligned and spaced bosses having aligned cylindrical openings, an externally threaded pin extending through said openings and through the cylindrical opening in the idler arm thereby retaining the idler arm between said bosses, said cylindrical openings having sleeve bushings positioned therein in end to end contact thereby forming a continuous bushing, said sleeve bushings being internally threaded for receiving the externally threaded pin, said bushings in the upper and lower openings being provided with a peripheral exterior flange on the outer ends thereof for limiting the inward movement of the bushings, said upper bushing flange including a closure thereby sealing the interior of the bushings, said pin having an integral headed end flange on the lower end thereof for abutting locking engagement with the flange on the lower bushing, said attaching member being provided with spaced points of attachment, said pin having a lubricating passage communicating with the interior of the sleeve bushing in the idler arm for lubricating the pivotal connection between the idler arm and the idler arm bracket.

References Cited in the file of this patent

UNITED STATES PATENTS

| | | |
|---|---|---|
| 2,039,912 | Leighton | May 5, 1936 |
| 2,076,852 | Leighton | Apr. 13, 1937 |
| 2,588,544 | Langer | Mar. 11, 1952 |